(12) United States Patent  
Gilbert

(10) Patent No.: US 7,909,921 B1
(45) Date of Patent: Mar. 22, 2011

(54) POLLUTION CONTROL DEVICE

(76) Inventor: John R. Gilbert, Englewood, CO (US)

( * ) Notice: Subject to any disclaimer, the term of this patent is extended or adjusted under 35 U.S.C. 154(b) by 719 days.

(21) Appl. No.: 11/940,621

(22) Filed: Nov. 15, 2007

(51) Int. Cl.
B01D 46/00 (2006.01)

(52) U.S. Cl. .......... 96/224; 55/350.1; 55/385.1; 55/423; 55/467; 55/480; 55/482; 55/484

(58) Field of Classification Search .................... 96/224; 55/350.1, 385.1, 423, 467, 480, 482, 484
See application file for complete search history.

(56) References Cited

U.S. PATENT DOCUMENTS

| 3,656,542 | A | | 4/1972 | Darm |
| D245,098 | S | | 7/1977 | Kay |
| 4,741,390 | A | | 5/1988 | Koch |
| 5,225,167 | A | * | 7/1993 | Wetzel ............................ 96/224 |
| 5,347,779 | A | | 9/1994 | Jordan |
| 5,523,057 | A | | 6/1996 | Mazzilli |
| 5,558,158 | A | * | 9/1996 | Elmore ......................... 165/122 |
| 5,894,130 | A | * | 4/1999 | Bach ............................. 250/436 |
| 5,902,552 | A | * | 5/1999 | Brickley ....................... 422/121 |
| 6,083,098 | A | | 7/2000 | Sotoda |
| 6,902,603 | B2 | * | 6/2005 | Wiser et al. ..................... 96/16 |
| 7,056,372 | B2 | * | 6/2006 | Cheng ............................ 96/224 |
| 7,151,264 | B2 | * | 12/2006 | Ehlers, Sr. ..................... 250/373 |
| 7,244,390 | B2 | * | 7/2007 | Bates et al. ..................... 422/24 |
| 2004/0041564 | A1 | * | 3/2004 | Brown ........................... 324/318 |
| 2005/0150386 | A1 | * | 7/2005 | Cheng ............................ 96/223 |
| 2006/0131511 | A1 | * | 6/2006 | Ehlers ........................... 250/373 |
| 2008/0022705 | A1 | * | 1/2008 | Clearman ....................... 62/173 |

* cited by examiner

Primary Examiner — Duane Smith
Assistant Examiner — Sonji Turner
(74) Attorney, Agent, or Firm — Crossley Patent Law; Mark A. Crossley

(57) ABSTRACT

A pollution control device that provides an external air filtration system for pollutants and other undesirable materials. The system includes a pipe which is attached to the external wall of a building and which provides water to each of the filtration units. An air flow chute is associated with the pollution control device and allows incoming air to pass through a replaceable filter and adjacent to an ultraviolet light setup that are located within each air filtration unit. The air being drawn into the system and subsequently filtered is drawn in by a rooftop device that draws air upward through the device and expels it through the top of the air flow chute.

6 Claims, 4 Drawing Sheets

US 7,909,921 B1

POLLUTION CONTROL DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The present invention concerns that of a new and improved pollution control device that provides an external air filtration system for pollutants and other undesirable materials.

SUMMARY OF THE INVENTION

The present invention concerns that of a new and improved pollution control device that provides an external air filtration system for pollutants and other undesirable materials. The system includes a pipe which is attached to the external wall of a building and which provides water to each of the filtration units. An air flow chute is associated with the pollution control device and allows incoming air to pass through a replaceable filter and adjacent to an ultraviolet light setup that are located within each air filtration unit. The air being drawn into the system and subsequently filtered is drawn in by a rooftop device that draws air upward through the device and expels it through the top of the air flow chute.

There has thus been outlined, rather broadly, the more important features of a pollution control device that the detailed description thereof that follows may be better understood and in order that the present contribution to the art may be better appreciated. There are, of course, additional features of the pollution control device that will be described hereinafter and which will form the subject matter of the claims appended hereto.

In this respect, before explaining at least one embodiment of the pollution control device in detail, it is to be understood that the pollution control device is not limited in its application to the details of construction and to the arrangements of the components set forth in the following description or illustrated in the drawings. The pollution control device is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present pollution control device. It is important, therefore, that the claims be regarded as including such equivalent constructions insofar as they do not depart from the spirit and scope of the present invention.

It is therefore an object of the present invention to provide a pollution control device which has all of the advantages of the prior art and none of the disadvantages.

It is another object of the present invention to provide a pollution control device which may be easily and efficiently manufactured and marketed.

It is another object of the present invention to provide a pollution control device which is of durable and reliable construction.

It is yet another object of the present invention to provide a pollution control device which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
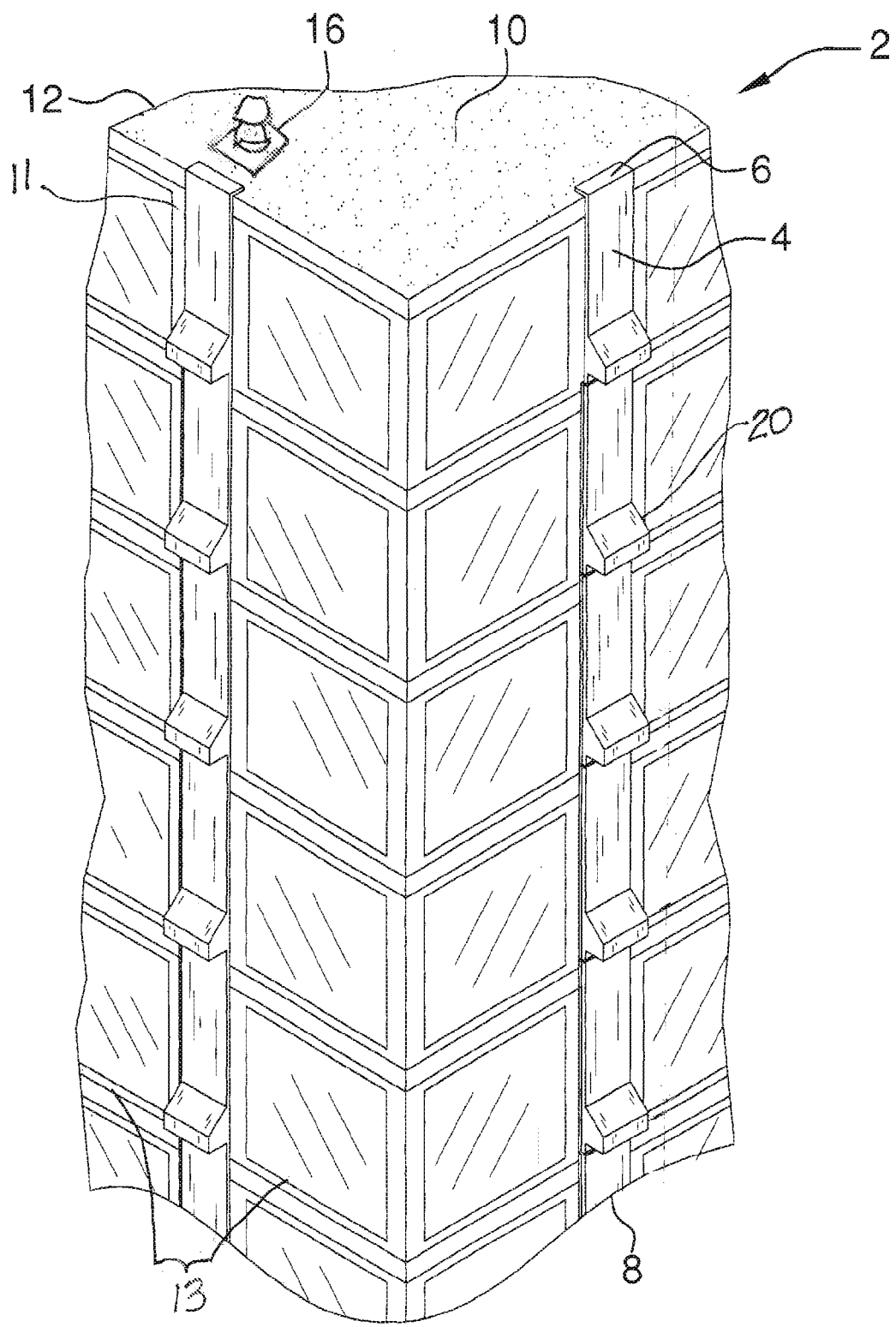
FIG. 1 shows a perspective view of the pollution control device as it would appear in use.
Figures 2, 3:
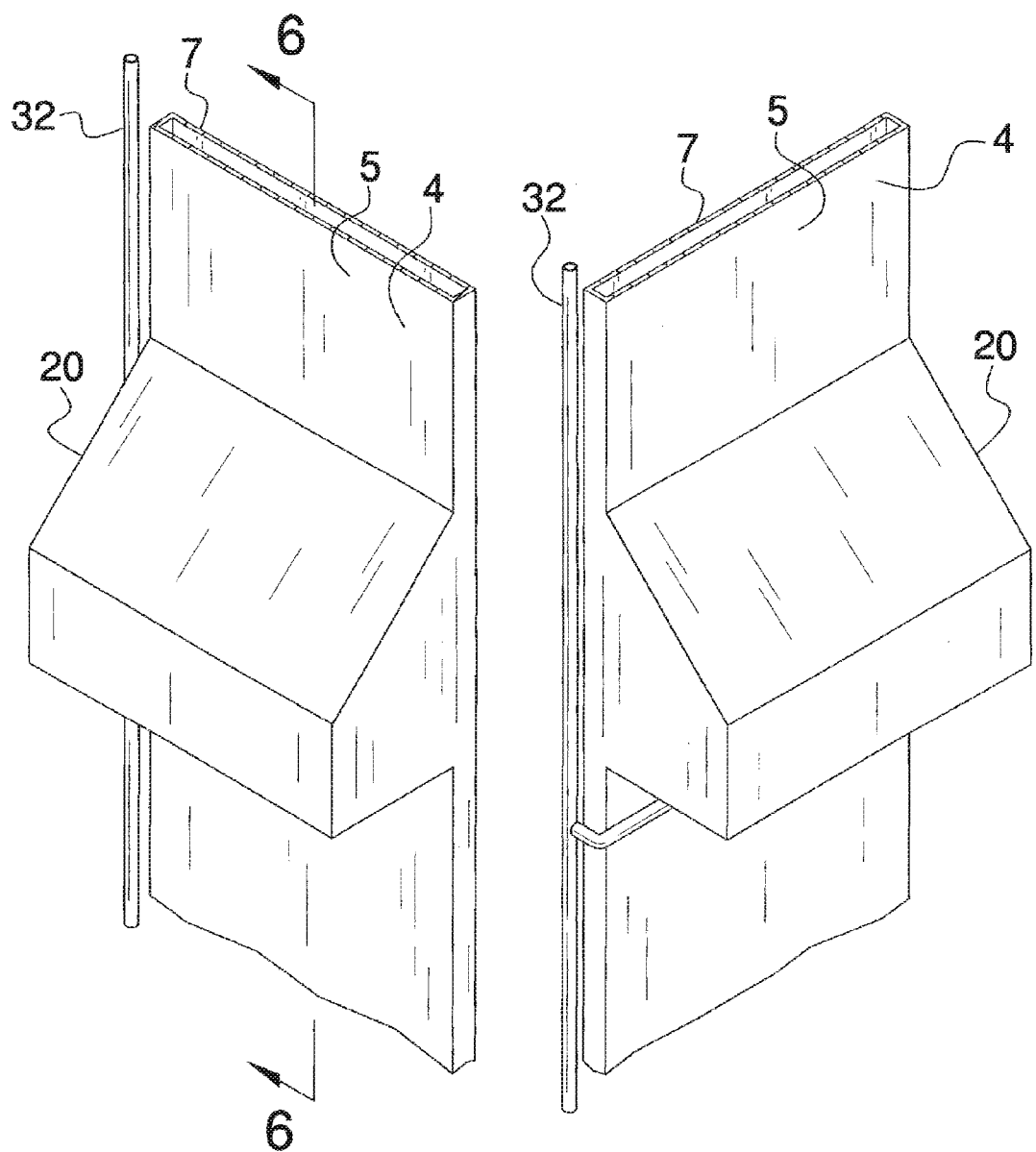
FIG. 2 shows a right front perspective view of an air flow chute.
FIG. 3 shows a left front perspective view of the air flow chute.
Figure 4:
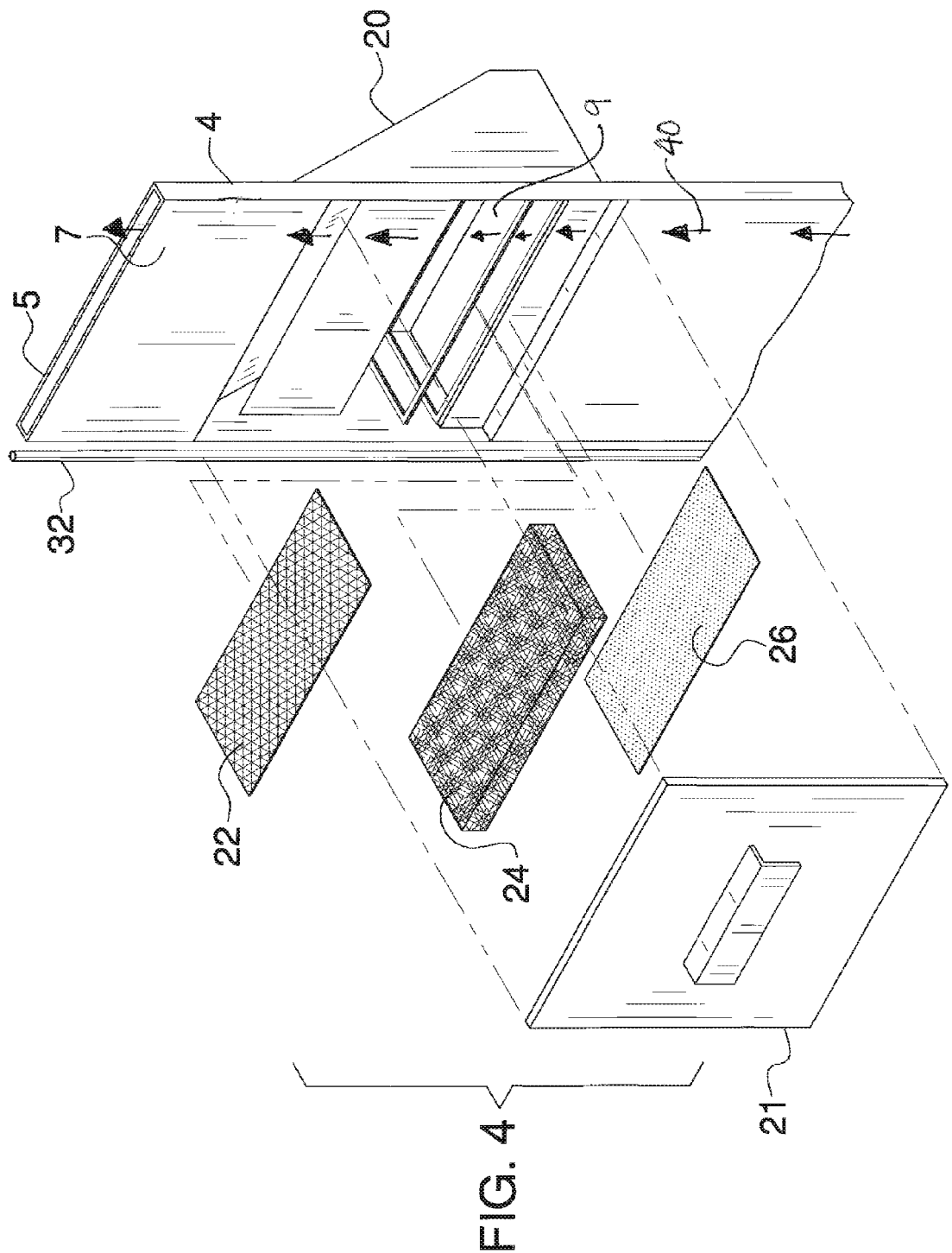
FIG. 4 shows a right front perspective view of the various components of the air flow chute in a disassembled state.

With reference now to the drawings, and in particular to FIGS. 1 through 5 thereof, a new pollution control device embodying the principles and concepts of the present invention and generally designated by the reference numeral 2 will be described.

Figure 5:
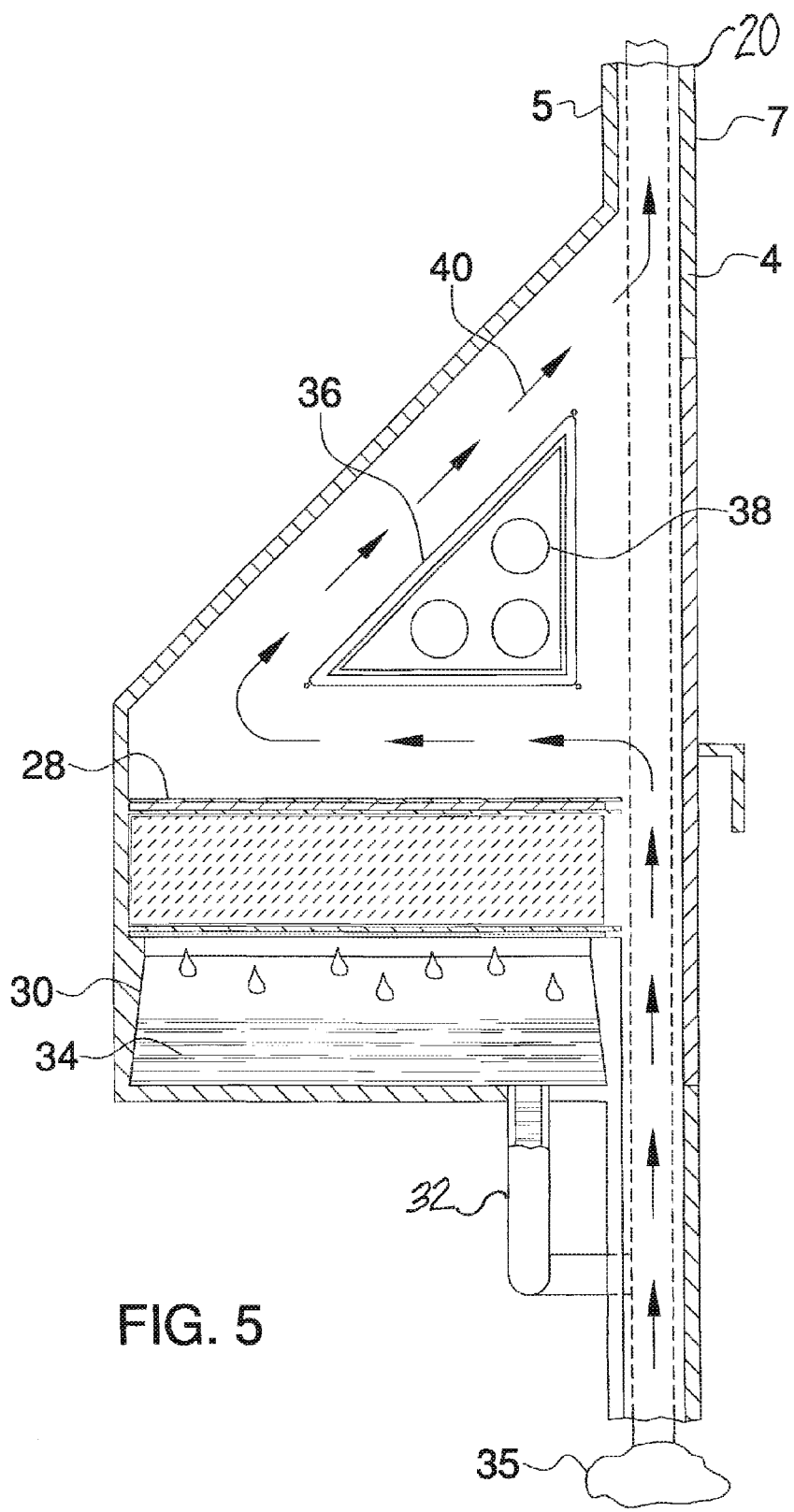
FIG. 5 shows a side view of the various components of the wind trap of the pollution control device as the air flow chute is shown in a disassembled state.

As best illustrated in FIGS. 1 through 5, the pollution control device 2 comprises at least one elongated thin parallelepiped air flow chute 4 that has two ends comprising a top end 6 and a bottom end 8. Furthermore, the air flow chute 4 has a front surface 5, and a rear surface 7, and a vertical hollow shaft 9 therebetween. The top end 6 of the air flow chute 4 is located on the roof 10 of a structure 12 and is designed to be connected to a roof ledge 14 in order to maintain an upward air flow for air being taken into the system as shown in FIG. 5. The length of the air flow chute 4 itself is connected to the structure 12. The front surface 5 and the rear surface 7 extend vertically downwardly outside an exterior wall 11 of the structure 12 between a column of paired horizontally aligned windows 13. At least one air circulation fan 16 is located on the roof 10. The air circulation fan 16 operationally engages the air flow chute 4 to circulate air flow from the bottom end 8 of the air flow chute 4 through the vertical hollow shaft 9.

The air flow chute 4 preferably has a rectangular cross-section. Over its entire length, the air flow chute 4 has a plurality of filtration units 20 that are designed to filter out pollutants in air passing through the pollution control device 2. Each of the filtration units 20 can be accessed through an access door 21 on the rear surface 7 of the air flow chute 4.

Each filtration unit 20 has a series of three filters comprising an upper filter 22, a middle filter 24, and a lower filter 26. The three filters 22-26 are designed to be placed into a filter compartment 28 that is essentially a slot within the filtration unit 20. The filter compartment 28 is located immediately over the water collection bin 30, which is designed to remove humidity within the air passing through the pollution control device 2. The water collection bin 30 is connected to a drainage pipe 32, which removes the collected water 34 as it accumulates in the water collection bin 30. The drainage pipe 32 is designed to travel to ground level, where it passes into a sanitary sewer 35 or other source.

Each filtration unit 20 also has an ultraviolet light fixture 36, with the fixture 36 designed to provide microorganism-killing properties. The fixture 36 has a plurality of miniature, halogenated ultraviolet lights 38 that will act to kill bacteria, viruses, small insects, and other small living organisms passing through the pollution control device 2. The ultraviolet light fixture 36 can also be removed via access through the access door 21.

The air flow 40 traveling upward through the air flow chute 4 passes through the filters 22-26 within each air flow chute 4 as it travels upward through the air pollution device 2. As a result, the filters 22-26 need to be regularly replaced.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. An air pollution device comprising
   at least one elongated thin parallelepiped air flow chute comprising a top end, a bottom end, a front surface, a rear surface, and a continuous vertical hollow shaft between the front surface and the rear surface, the top end attached to a roof ledge of a structure in a position perpendicular to the front surface;
   wherein the front surface and the rear surface extend vertically downwardly outside an exterior wall of the structure between a column of paired horizontally aligned windows;
   at least one air circulation fan disposed on a roof of the structure;
   wherein the air circulation fan operationally engages the air flow chute and circulates air flow from the bottom end of each air flow chute through the vertical hollow shaft;
   wherein the air flow chute receives air flow therethrough from the bottom end thereof through the hollow shaft;
   wherein the means for filtering the air that passes through the air pollution device further comprises
   (a) a plurality of filtration units located on the air flow chute, and
   (b) means for accessing each filtration unit.

2. An air pollution device according to claim 1 wherein the means for accessing each filtration unit further comprises an access door on the rear surface of the air flow chute, wherein the access door covers a particular filtration unit.

3. An air pollution device according to claim 2 wherein each filtration unit further comprises
   (a) a filter compartment,
   (b) a plurality of individual filters placed within the filter compartment,
   (c) a water collection bin placed directly underneath each filter compartment, and
   (d) means for draining water that is collected within each water collection bin.

4. An air pollution device according to claim 3 wherein the plurality of individual filters placed within the filter compartment number three filters.

5. An air pollution device according to claim 4 wherein the means for draining water that is collected within each water collection bin further comprises a drainage pipe, the drainage pipe being attached to each water collection bin.

6. An air pollution device according to claim 5 wherein the means for filtering the air that passes through the air pollution device further comprises
   (a) an ultraviolet light fixture mounted within each filtration unit,
   (b) wherein a plurality of ultraviolet lights are located within each ultraviolet light fixture.

* * * * *